(12) United States Patent
Chen et al.

(10) Patent No.: US 8,001,674 B2
(45) Date of Patent: Aug. 23, 2011

(54) AUTOMATIC DISASSEMBLY MACHINE

(75) Inventors: Kun Chen, Shenzhen (CN); Chin-Tsan Huang, Taipei Hsien (TW); Dong-Cheng Liu, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 670 days.

(21) Appl. No.: 12/127,835

(22) Filed: May 28, 2008

(65) Prior Publication Data
US 2009/0193651 A1    Aug. 6, 2009

(30) Foreign Application Priority Data
Feb. 1, 2008    (CN) .......................... 2008 1 0300297

(51) Int. Cl.
    *B23P 21/00*    (2006.01)
(52) U.S. Cl. ................... 29/709; 29/713; 29/714
(58) Field of Classification Search ............ 29/709, 29/713, 714
    See application file for complete search history.

(56) References Cited

U.S. PATENT DOCUMENTS

| | | | | |
|---|---|---|---|---|
| 4,901,431 A | * | 2/1990 | Gast | 29/707 |
| 4,973,215 A | * | 11/1990 | Karlen et al. | 414/729 |
| 5,155,423 A | * | 10/1992 | Karlen et al. | 318/568.11 |
| 5,570,992 A | * | 11/1996 | Lemelson | 414/744.3 |
| 6,553,652 B2 | * | 4/2003 | Sakakibara et al. | 29/709 |

* cited by examiner

*Primary Examiner* — Carl Arbes
(74) *Attorney, Agent, or Firm* — Altis Law Group, Inc.

(57) ABSTRACT

An exemplary automatic disassembly machine is used for detaching a cover from a main body of a portable electronic device. The cover defines a hole therein. The automatic disassembly machine includes a holder, a mechanical hand, a power source, and a controller. The mechanical hand is fixed on the holder. The mechanical hand has an inserting element, and a positioning element. The inserting element is configured for inserting into the hole of the cover and lifting the cover up from the portable electronic device. The positioning element is configured for positioning the cover. The power source connects to the mechanical hand for driving the mechanical hand. The controller connects to the mechanical hand and the power source for respectively controlling the positioning element and the inserting element to detach the cover from the portable electronic device.

15 Claims, 8 Drawing Sheets

AUTOMATIC DISASSEMBLY MACHINE

BACKGROUND

1. Field of the Invention

The present invention generally relates to automatic disassembly machines, and more particularly to an automatic disassembly machine for disassembling a cover from a portable electronic device.

2. Discussion of the Related Art

In recent years, there has been an increase in demand for portable electronic devices, such as personal digital assistants (PDAs), mobile phones, MP3 players, and MP4 players. Commonly, when the portable electronic devices have defects, covers of the portable electronic devices should be disassembled from the portable electronic devices to allow access for repairing the portable electronic devices.

Currently, disassembling the covers from the portable electronic devices is usually done manually, which is time consuming.

What is needed, therefore, is an automatic disassembly machine for disassembling a cover from a portable electronic device that can overcome the above-mentioned shortcomings.

SUMMARY

An automatic disassembly machine is used for detaching a cover from a main body of a portable electronic device. The cover defines a hole therein. The automatic disassembly machine includes a holder, a mechanical hand, a power source, and a controller. The mechanical hand is fixed on the holder. The mechanical hand has an inserting element, and a positioning element. The inserting element is configured for inserting into the hole of the cover and lifting the cover up from the portable electronic device. The positioning element is configured for positioning the cover. The power source connects to the mechanical hand for driving the mechanical hand. The controller connects to the mechanical hand and the power source for respectively controlling the positioning element and the inserting element to detach the cover from the portable electronic device.

Other novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present automatic disassembly machine. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present automatic disassembly machine in detail.

Figure 1:
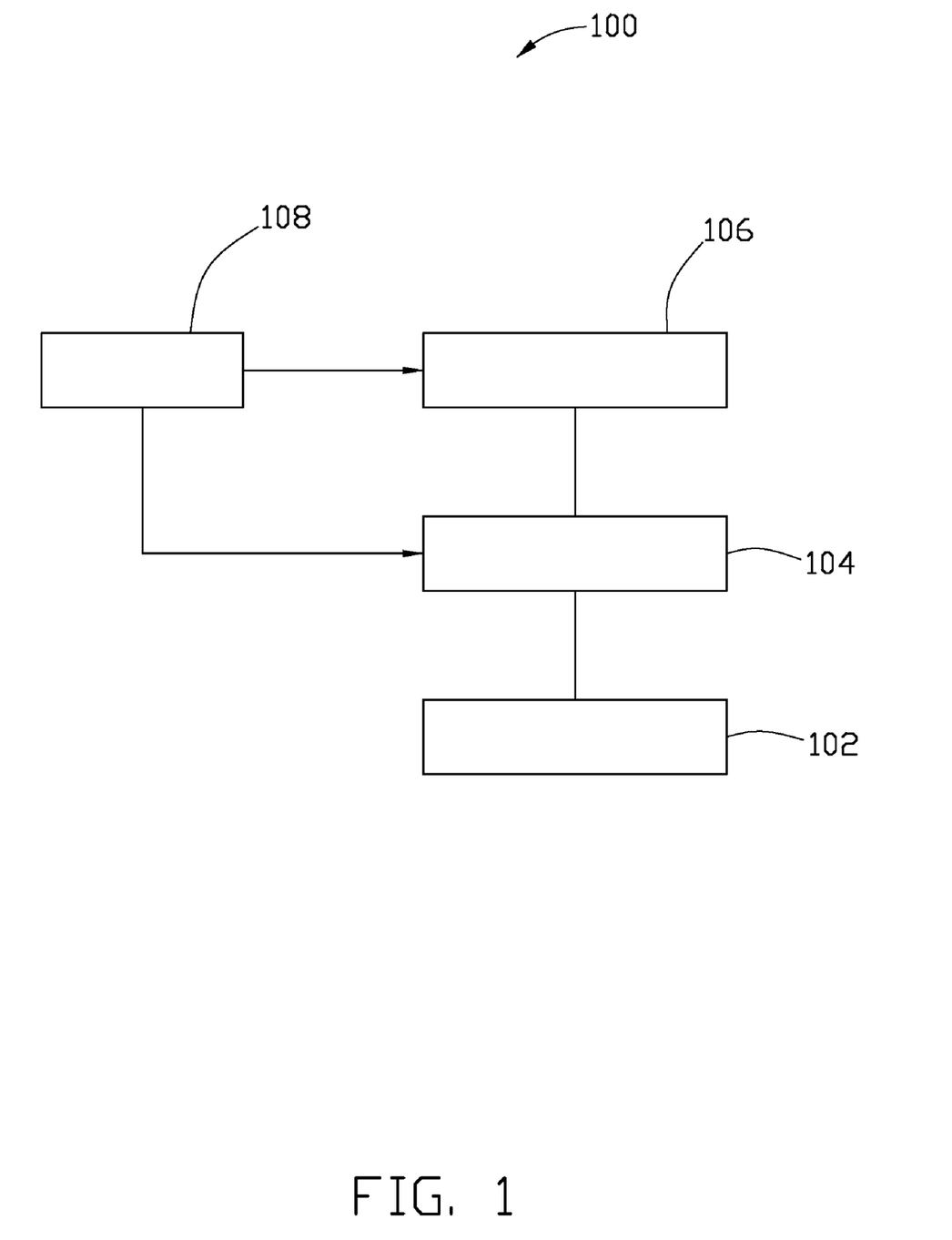
FIG. 1 is a schematic view of an automatic disassembly machine in accordance with a preferred embodiment of the present invention.

An automatic disassembly machine according to a preferred embodiment is used for detaching a cover 74 from a main body 72 of a portable electronic device 70. The portable electronic device 70 is a mobile phone for exemplary purposes, but may be other portable devices, such as a personal digital assistant, an MP3 player, or an MP4 player. The cover 74 defines two holes 742 therein (see FIG. 7). Referring to FIG. 1, the automatic disassembly machine 100 includes a holder 102, a mechanical hand 104, a power source 106, and a controller 108. The mechanical hand 104 is fixed on the holder 102. The mechanical hand 104 includes two inserting elements 45 configured for inserting into the holes 742 of the cover 74 and lifting the cover 74 up from the portable electronic device 70, and two positioning elements 58 configured for positioning the cover 74. The power source 106 connects with the mechanical hand 104. The power source 106 is used for driving the mechanical hand 104. The power source 106 has an air pump (not shown) for exemplary purposes. The controller 108 connects to the mechanical hand 104 and/or the power source 102. The controller 108 respectively controls the positioning elements 58 and the inserting elements 45 to detach the cover 74 from the portable electronic device 70.

Figure 2:
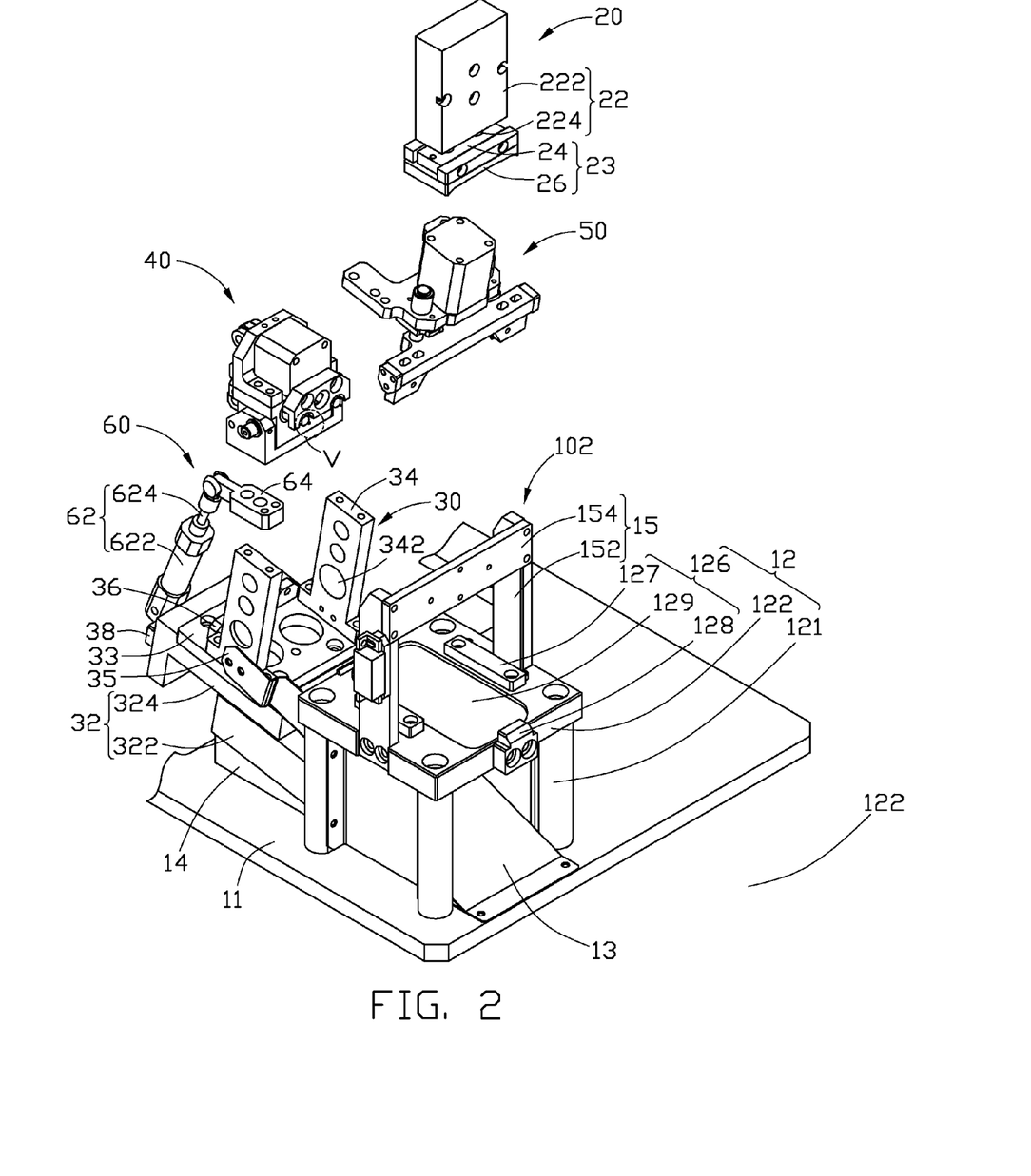
FIG. 2 is a partial, exploded view of the automatic disassembly machine of FIG. 1.
Figure 3:
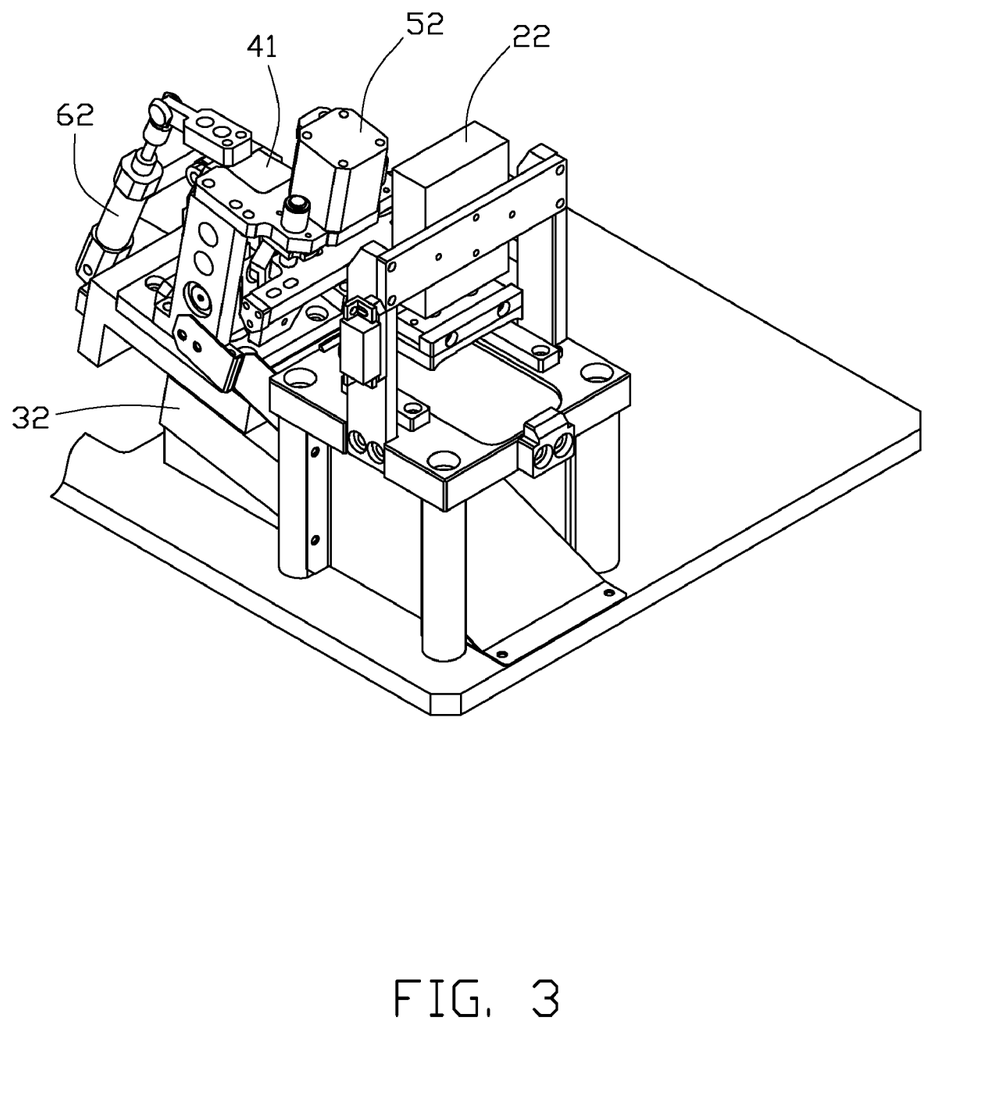
FIG. 3 is a partial, assembled view of the automatic disassembly machine of FIG. 1.

Referring to FIG. 2, the holder 102 includes a bottom board 11, a platform 12, a sliding board 13, a supporting block 14, and a ∩-shaped frame 15. The platform 12 includes four pillars 121, a top board 122, and a positioning element 126. The top board 122 is on top of the four pillars 121. The positioning element 126 is located on a top surface of the board 122. The positioning element 126 includes two long restricting blocks 127, two short restricting blocks 128, and a depression 129 for receiving the portable electronic device 70. The depression 129 is defined in the top surface of the board 122. The restricting blocks 126, and 128 surround the depression 129. The sliding board 13 is located under the top board 122. An upper surface of the sliding board 13 is sloping for the detached cover 74 sliding out from the sliding board 13. The supporting block 14 is under the sliding board 13 for supporting the sliding board 13. The ∩-shaped frame 15 is located above the positioning element 126. The ∩-shaped frame 15 includes two side columns 152, and a top column 154. The two side columns 152 are fixed on opposite sides of the top board 122 of the platform 12. The top column 154 connects the two side columns 152.

The mechanical hand 104 includes a first extension module 20, a second extension module 30, a third extension module 40, a fourth extension module 50, and a fifth extension module 60.

Figure 8:
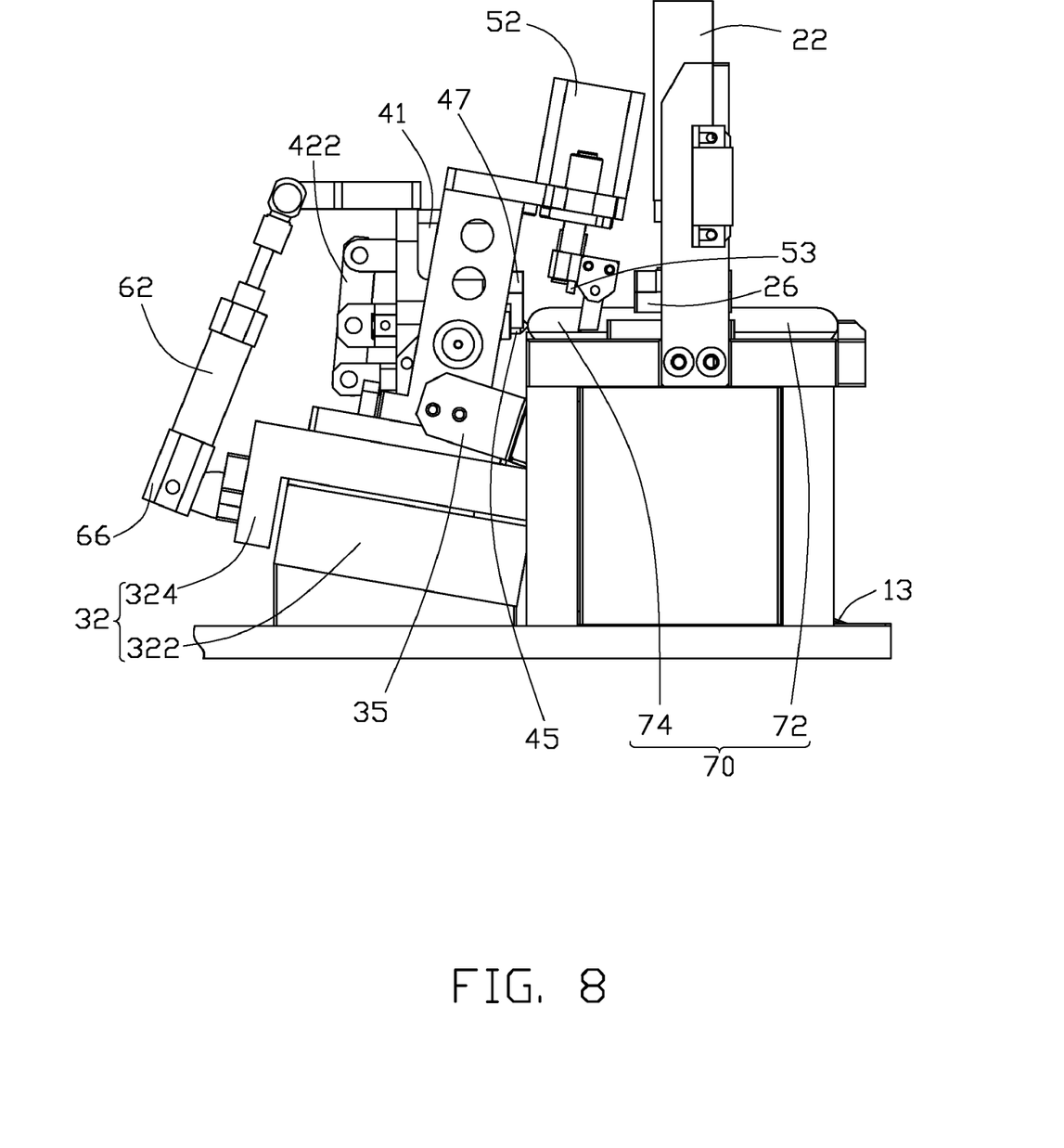
FIG. 8 is a schematic view of the automatic disassembly machine of FIG. 1, showing a positioning element cutting into a cover of the portable electronic device.

The first extension module 20 includes an air cylinder 22, and a pressing element 23. The air cylinder 22 has a cylinder body 222, and a piston rod 224 connected to the cylinder body 222. The cylinder body 222 is fixed on the top column 154 of the ∩-shaped frame 15 of the holder 102. The pressing element 23 includes a pressing board 24, and a cushion 26 on the pressing board 24. The pressing board 24 is fixed with the piston rod 224. The cushion 26 is used to contact the main body 72 of the portable electronic device 70, as shown in FIG. 8.

The second extension module 30 includes an air cylinder 32, a supporting board 33, two sideboards 34, a discharging channel 35, two restricting boards 36, and a connecting block 38. The air cylinder 32 has a cylinder body 322, and a moving board 324. The moving board 324 has a piston rod (not shown) connected to the cylinder body 322. The supporting board 33 is fixed on the moving board 324. Two sideboards 34 are fixed on two opposite sides of the supporting board 33 respectively. Each sideboard 34 defines a hole 342. The discharging channel 35 is slantwise fixed to the sideboards 34 above the sliding board 13 of the holder 102. The restricting boards 36 are located on the supporting board 33 beside the sideboards 34 correspondingly. The connecting block 38 is located at an end of the moving board 324 for connecting with the fifth extension module 60.

Figure 4:
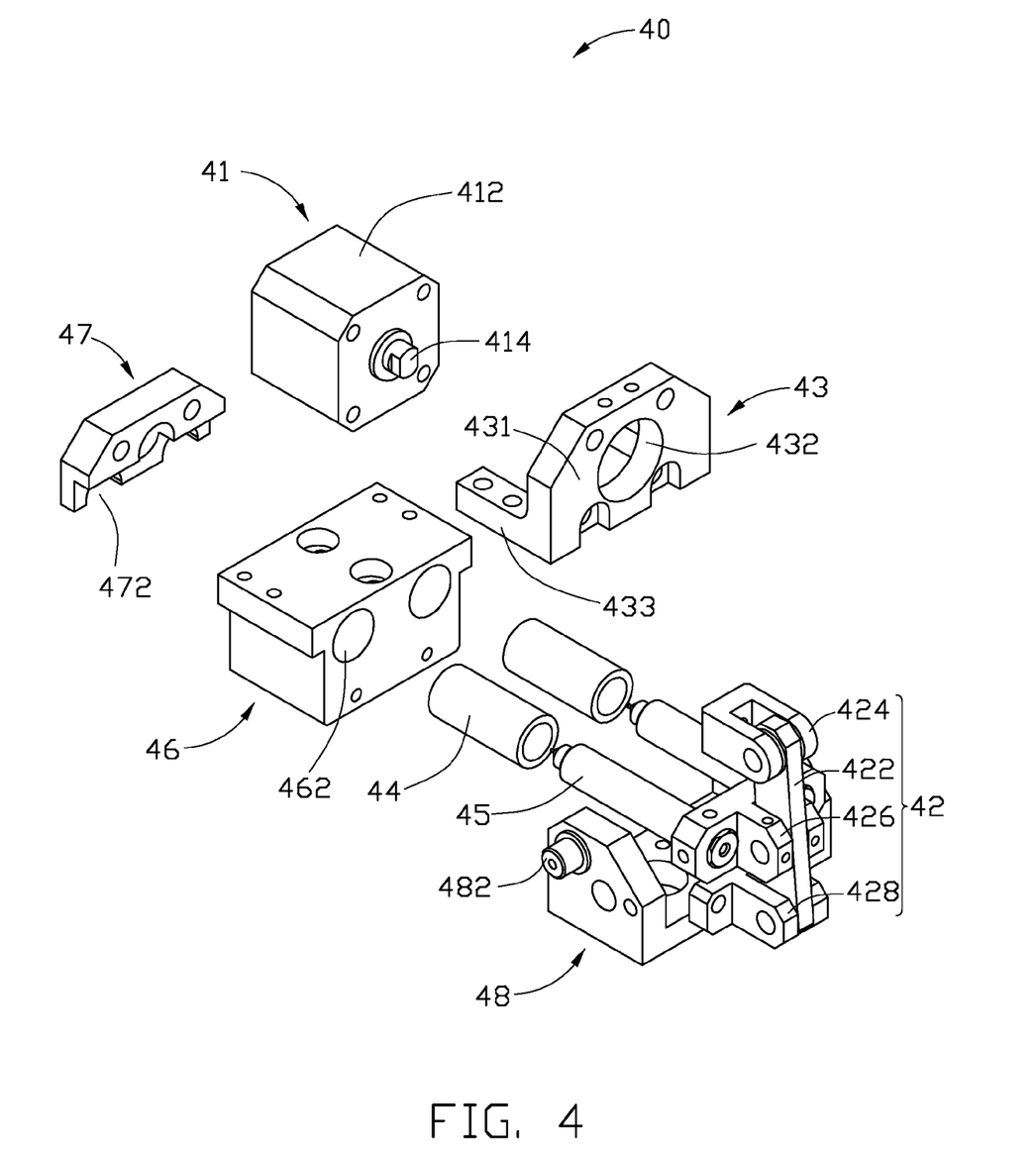
FIG. 4 is an exploded view of a third extension module of the automatic disassembly machine of FIG. 2.

Referring to FIG. 4, the third extension module 40 includes an air cylinder 41, a hinge element 42, an upper base 43, two sleeves 44, two inserting elements 45, a middle base 46, a disengaging board 47, and a bottom base 48. The air cylinder 41 has a cylinder body 412, and a piston rod 414 connected to the cylinder body 412. The cylinder body 412 is located on the upper base 43. The hinge element 42 includes pivot rod 422, an upper hinge part 424, a middle hinge part 426, and a bottom hinge part 428. The hinge parts 424, 426, and 428 are rotatably connected to an upper portion, a middle portion, and a bottom portion of the pivot rod 422 respectively. The bottom hinge part 428 is fixed to bottom base 48. The upper base 43 has a sidewall 431, and a bottom wall 433 connecting with the sidewall 431. The third extension module 40 connects with the fifth extension module 60 at a top of the sidewall 431. The sidewall 431 defines a through hole 432 therethrough. The piston rod 414 runs through the through hole 432 and connects with the upper hinge part 424 of the hinge element 42. The middle base 46 is fixed with the bottom base 48 and defines two holes 462 therethrough. The two sleeves 44 engage in the two holes 462 respectively. The two inserting elements 45 are fixed on the middle hinge part 426 of the hinge element 42 and run through the two sleeves 44 correspondingly. The disengaging board 47 is fixed on a side of the middle base 46 away from the hinge element 42. The disengaging board 47 defines two arc-shaped grooves 472 corresponding to the holes 462 of the bottom base 48. The two inserting elements 45 may also run through the two arc-shaped grooves 472 correspondingly. The bottom base 48 has two pivot shafts 482 on opposite sides of the bottom base 48. The two pivot shafts 482 engage in the two holes 342 of the second extension module 30, thereby the third extension module 40 rotatably connecting with the second extension module 30.

Figure 5:
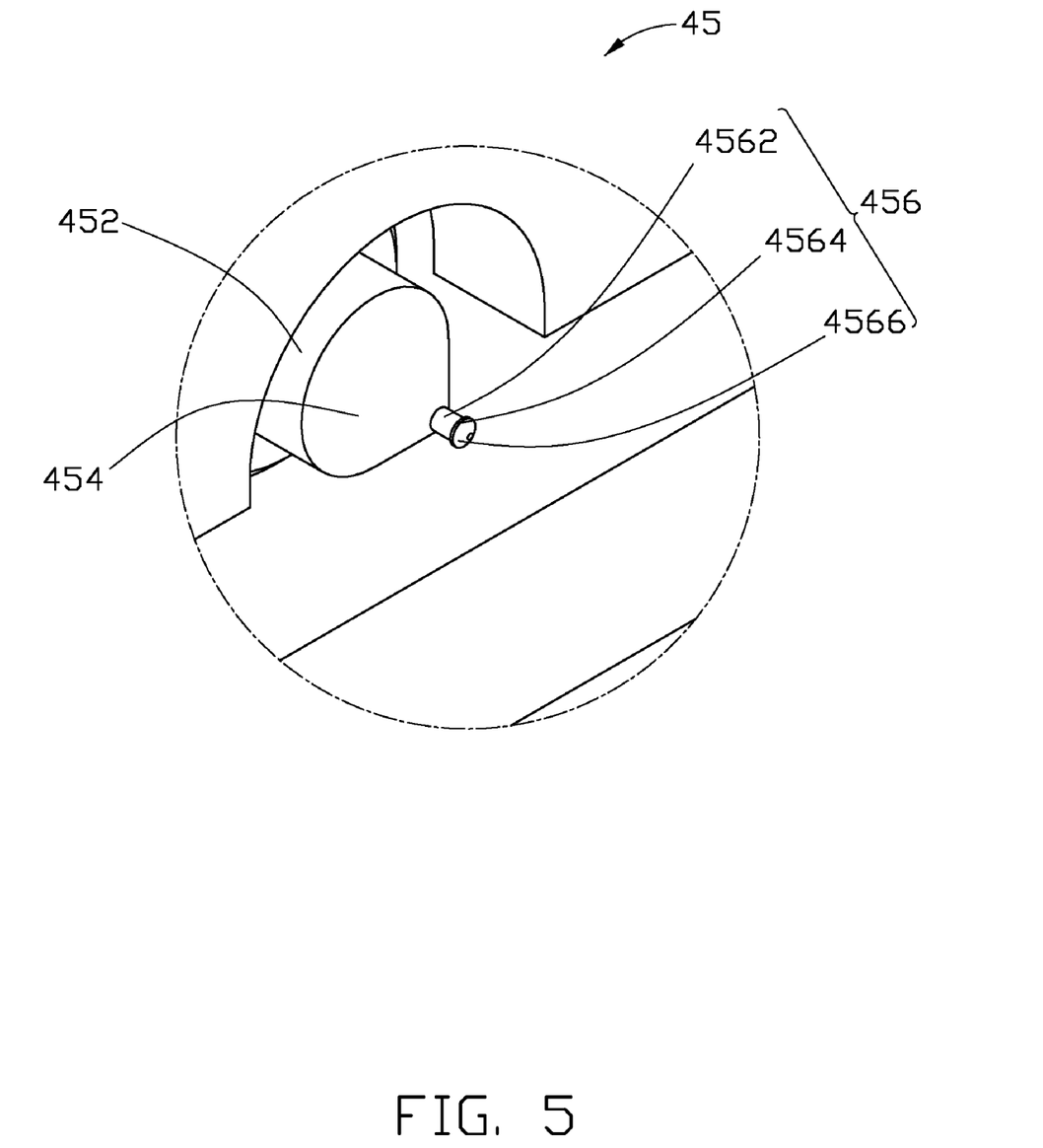
FIG. 5 is an enlarged view of a circled portion V of FIG. 2.

Referring to FIGS. 4 and 5, each of the inserting elements 45 is a needle, which is made of steel. Each inserting element 45 includes a pole portion 452, a connecting portion 454, and a pinhead 456. The connecting portion 454 connects the pole portion 452 and the pinhead 456. The pinhead 456 includes a columnar portion 4562, a protrusion 4564, and a tapered portion 4566. The protrusion 4564 is located between the columnar portion 4562 and the tapered portion 4566. The pinheads 456 may insert into the holes 742 of the cover 74 of the portable electronic device 70. A distance from a center axis of the pinhead 456 to an outer surface of the protrusion 4564, corresponds to the radius of the hole 742 of the cover 74.

Figure 6:
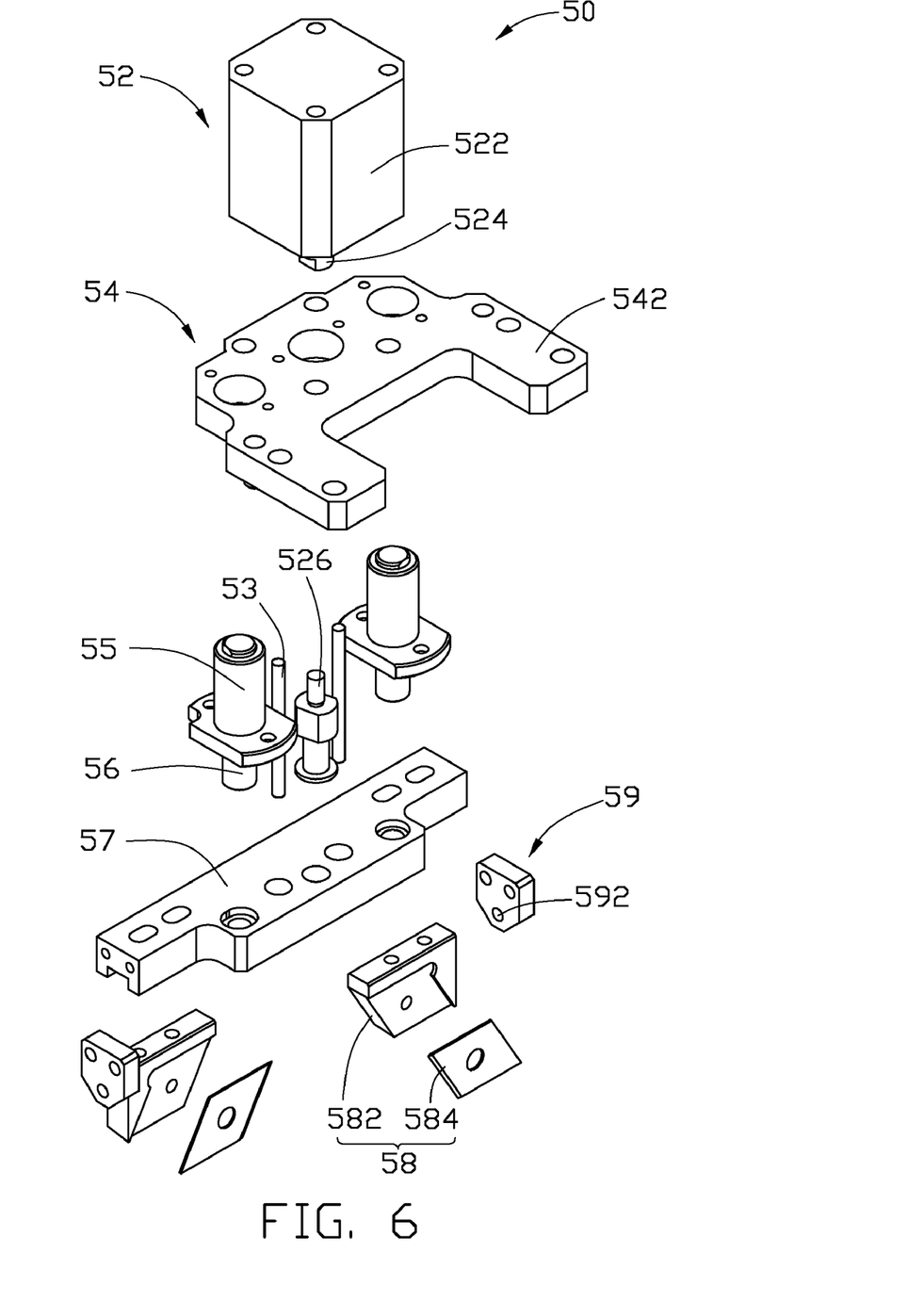
FIG. 6 is an exploded view of a fourth extension module of the automatic disassembly machine of FIG. 2.

Referring to FIGS. 2 and 6, the fourth extension module 50 includes an air cylinder 52, two disengaging poles 53, a connecting board 54, two sleeves 55, two drawing shafts 56, a drawing board 57, the two positioning elements 58, and two adjusting elements 59. The air cylinder 52 includes a cylinder body 522, a piston rod 524, and a connecting rod 526. The piston rod 524 connects the cylinder body 522 and the connecting rod 526. The cylinder body 522, the disengaging poles 53, the connecting board 54, and the sleeves 55 are fixed together. The connecting board 54 has two extending portions 542. The extending portions 542 are fixed with the sideboards 34 of the second extension module 30. The drawing shafts 56 pass through the connecting board 54 and engage with sleeves 55 correspondingly. The drawing shafts 56, the drawing board 57, the positioning elements 58 and the adjusting elements 59 are fixed together.

Each of the positioning elements 58 includes a positioning board 582, and a blade 584 configured on the positioning board 582. The adjusting elements 59 are located on opposite sides of the drawing board 57. Each adjusting element 59 connects with one of the positioning board 582 and defines an adjusting hole 592. By adjusting a screw (not shown) received in the adjusting hole 592, a position of the blade 584 relative to the cover 74 of the portable electronic device 70 may be adjusted.

Figure 7:
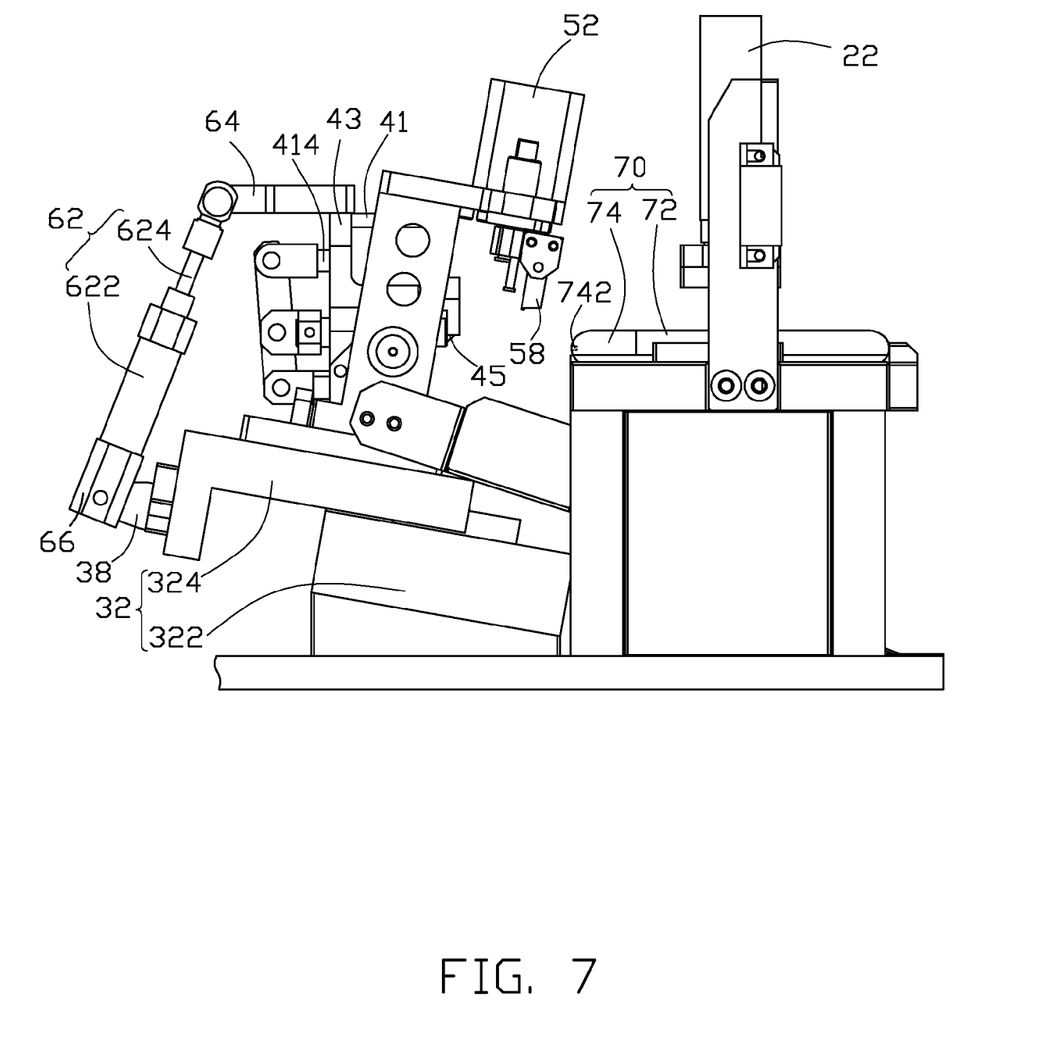
FIG. 7 is a schematic view of the automatic disassembly machine of FIG. 1, showing a portable electronic device placed thereon.

Referring to FIGS. 2 and 7, the fifth extension module 60 includes an air cylinder 62, an upper connecting board 64, and a lower connect board 66. The air cylinder 62 includes a cylinder body 622, a piston rod 624 connecting with the cylinder body 622. One end of the upper connecting board 64 rotatably connects to the piston rod 624, the other end of the upper connecting board 64 is fixed to a top of the upper base 43 of the third extension module 40. One end of the lower connect board 66 is fixed to the cylinder body 622, the other end of the lower connect board 66 rotatably connects to the connecting block 38 of the second extension module 30.

The power source 106 comprises the air pump (not shown) and a plurality of electromagnetic valves (not shown). The air pump connects to the air cylinders 222, 322, 412, 522 and 622 via the plurality of electromagnetic valves. Each of the electromagnetic valves electrically connects with the controller 108. By the controller 108 controlling the electromagnetic valves, the positioning elements 58 of the mechanical hand 104 position the cover 74 by action of the plates 584 cutting into the cover 74, and the inserting elements 45 of the mechanical hand 104 inserting into the holes 742 of the cover 74.

Referring to FIGS. 2 and 7, before use, the piston rods 224, and 524 of the automatic disassembly machine 100 are retracted into the cylinder bodies 222, and 522 respectively. The piston rods 414, and 624 extend outside the cylinder bodies 412, and 622 respectively. In addition, an end of the moving board 324 connecting with the lower connect board 66 of the fifth extension module 60 is positioned apart from the cylinder body 322.

In use, the portable electronic device 70 is positioned by the positioning element 126 of the holder 102 of the automatic disassembly machine 100; and then the power source 106 is started up. Under control of the controller 108, first, in the first extension module 20, the piston rods 224 extend out from the cylinder bodies 222, thereby causing the pressing element 23 to press on the main body 72 of the portable electronic device 70. Second, in the second extension module 30, the end of the moving board 324 connected to the lower connect board 66 moves towards the cylinder body 322; the moving board 324 brings the extension modules 40, 50, and 60 close to the portable electronic device 70. Temporarily, the inserting elements 45 of the third extension module 40 are adjacent to the holes 742 of the portable electronic device 70, and the positioning elements 58 of the fourth extension module 50 are adjacent to the cover 74 of the portable electronic device 70. Third, in the third extension module 40, the piston rod 414 is retracted into the main body 412. The piston rod 414 draws the upper hinge part 424 of the hinge element 42 to move, whereby the pivot rod 422 rotates about the bottom hinge part 428, and thus the hinge part 426 causes the inserting elements 45 to extend out the disengaging board 47 and insert into the holes 742 of the portable electronic device 70. Fourth, in the fourth extension module 50, the piston rod 524 extends out from the cylinder body 522 of the air cylinder 52. The piston rod 524 pulls the plates 584 of the positioning elements 58 to cut into the cover 74 on opposite sides of the portable electronic device 70, as shown in FIG. 8. Fifth, the piston rod 624 is retracted into the cylinder body 622 of the fifth extension module 60. Cooperating with the restricting boards 36 of the second extension module 30, the piston rod 624 draws the third extension module 40 by the upper connecting board 64 to rotate about the pivot shafts 482 to a certain degree. Thereby, the inserting elements 45 are tilted and forces the cover 74 to move away from the main body 72 of the portable electronic device 70. Sixth, the air cylinder 32 is restored. The moving board 324 moves the extension modules 40, 50 and 60 away from the portable electronic device 70. The inserting elements 45 and the positioning elements 58 cooperatively further move the cover 74 away from the main body 72. Seventh, the air cylinder 62 of the fifth extension module 60 is restored; then the air cylinder 52 of the third extension module 50 is restored. The piston rod 524 is retracted into the cylinder body 522. The positioning elements 58 moves the cover 74 up until the cover 74 meets the disengaging poles 53. The disengaging poles 53 separates the cover 74 from the positioning elements 58. The air cylinder 41 of the third extension module 40 is restored, that is the piston rod 414 is retracted into the cylinder body 412. The inserting elements 45 move the cover 74 towards the air cylinder 41, until the cover 74 meets the disengaging board 47. The disengaging board 47 separates the cover 74 from the inserting elements 45. Therefore, the cover 74 falls into discharging channel 35 of the second extension module 30, and slides to the sliding board 13. Finally, the air cylinder 22 of the first extension module 20 is restored, and then the main body 12 may be taken out for repairs.

Under control of the controller 108 of the automatic disassembly machine 100, the air cylinders 22, 32, 41, 52 and 62 of the mechanical hand 104, cause the inserting elements 45 to cooperate with the positioning elements 58 to detach the cover 74 from the portable electronic device 70. Therefore, the automatic disassembly machine 100 may automatically disassemble the portable electronic device 70. It should be understood that, even if the portable electronic device 70 employs a latching mechanism located on an interior of the cover 72, the automatic disassembly machine 100 can overcome the connection between the cover 72 and the main body 74 by the latching mechanism.

It is noted that the scope of the present automatic disassembly machine is not limited to the embodiments described above. For example, the power source 106 can be an electrical source, and the air cylinders 222, 322, 412, 522 and 622 may be replaced with motors.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An automatic disassembly machine for detaching a cover from a main body of a portable electronic device, the cover defining a hole therein, the automatic disassembly machine comprising:
   a holder;
   a mechanical hand fixed on the holder, the mechanical hand having an inserting element configured for inserting into the hole of the cover and lifting the cover up from the portable electronic device, a positioning element configured for positioning the cover, and an adjusting element connecting with the positioning element for adjusting a position of the positioning element;
   a power source connected to the mechanical hand for driving the mechanical hand; and
   a controller connected to the mechanical hand and the power source for respectively controlling the positioning element and the inserting element to detach the cover from the portable electronic device.

2. The automatic disassembly machine as claimed in claim 1, wherein the mechanical hand comprises a first extension module having a pressing element for fixing the main body of the portable electronic device.

3. The automatic disassembly machine as claimed in claim 2, wherein the mechanical hand further comprises a second extension module, a third extension module, a fourth extension module and a fifth extension module, the second extension module having a moving board capable of moving the third extension module, the fourth extension module and the fifth extension module relative to the holder and the first extension module.

4. The automatic disassembly machine as claimed in claim 3, wherein the second extension module further comprises a sideboard, the sideboard located on the moving board, the sideboard rotatable connecting with the third extension module and fixed with the fourth extension module.

5. The automatic disassembly machine as claimed in claim 3, wherein the third extension module comprises a base, and a hinge element, the hinge element configured on the base, the hinge element used for making the inserting element move, the base having a pivot shaft, the sideboard of the second extension module connecting with the third extension module at the pivot shaft.

6. The automatic disassembly machine as claimed in claim 5, wherein the third extension module further comprises a disengaging board configured on the base, the disengaging board used for making the cover disengage from the inserting element.

7. The automatic disassembly machine as claimed in claim 6, wherein the inserting element comprises a pinhead, the pinhead having a columnar portion, a tapered portion, and a protrusion, the protrusion located between the columnar portion and the tapered portion.

8. The automatic disassembly machine as claimed in claim 3, wherein the fourth extension module comprises a connecting board, a disengaging pole, a drawing board, the sideboard of the second extension module fixed with the fourth extension module by the connecting board, the disengaging pole fixed to the connecting board, the drawing board located under the connecting board, the positioning element fixed to the drawing board.

9. The automatic disassembly machine as claimed in claim 8, wherein the adjusting element is fixed to the drawing board.

10. The automatic disassembly machine as claimed in claim 3, wherein the fifth extension module rotatable connects with second extension module and the third extension module respectively.

11. The automatic disassembly machine as claimed in claim 3, wherein the holder comprises a platform, a sliding board, a ∩-shaped frame, and a platform, the platform having a top board, and a positioning element formed on the top board, the sliding board located under the top board of the platform, the ∩-shaped frame located above the positioning element, the first extension module configured on the ∩-shaped frame.

12. The automatic disassembly machine as claimed in claim 3, wherein the power source comprises an air pump, each of the extension modules comprises an air cylinder connecting to the air pump, each air cylinder having a piston rod, the controller capable of controlling the piston rods of the air cylinders to move.

13. The automatic disassembly machine as claimed in claim 3, wherein the power source further comprises a plurality of electromagnetic valves, the air cylinders connecting to the air pump by the electromagnetic valves.

14. The automatic disassembly machine as claimed in claim 1, wherein the power source is an electrical source.

15. The automatic disassembly machine as claimed in claim 14, wherein the mechanical hand comprises a motor electrically connected to the power source.

* * * * *